United States Patent [19]

Adams et al.

[11] Patent Number: 5,392,859
[45] Date of Patent: Feb. 28, 1995

[54] ACID STIMULATION PROCESS FOR PRODUCTION FROM SUBTERRANEAN FORMATIONS

[75] Inventors: Gerald C. Adams, Sugar Land; Jimmie B. Lawson; Lee N. Morgenthaler, both of Houston, all of Tex.

[73] Assignee: Shell Oil Company, Houston, Tex.

[21] Appl. No.: 160,995

[22] Filed: Dec. 2, 1993

[51] Int. Cl.6 ............................................. E21B 43/27
[52] U.S. Cl. .................................... 166/300; 166/307; 166/309
[58] Field of Search ............... 166/307, 309, 281, 300; 252/8.553

[56] References Cited

U.S. PATENT DOCUMENTS

| | | | |
|---|---|---|---|
| 2,053,285 | 9/1936 | Grebe | 166/307 X |
| 3,342,256 | 9/1967 | Bernard et al. | |
| 3,434,545 | 3/1969 | Bombardieri | 166/307 |
| 3,500,923 | 3/1970 | Reisberg | 166/274 |
| 3,612,179 | 10/1971 | Anderson et al. | 166/281 |
| 3,612,182 | 10/1971 | Raifsnider | 166/307 |
| 3,712,377 | 1/1973 | Hill et al. | 166/252 |
| 3,724,549 | 4/1973 | Dill | 166/282 |
| 3,768,564 | 10/1973 | Knox et al. | 166/307 |
| 3,860,072 | 1/1975 | Tate | 166/308 |
| 3,890,239 | 6/1975 | Dycus et al. | 166/274 X |
| 3,937,283 | 2/1976 | Blauer et al. | 166/307 |
| 3,946,813 | 3/1976 | Tate et al. | 166/307 |
| 3,954,142 | 5/1976 | Broaddus et al. | 166/307 |
| 4,044,833 | 8/1977 | Volz | 166/307 |
| 4,113,011 | 9/1978 | Bernard et al. | 166/273 |
| 4,156,464 | 5/1979 | Hussin | 166/307 X |
| 4,199,027 | 4/1980 | Cox et al. | 166/274 |
| 4,233,165 | 11/1980 | Salathiel et al. | 252/8.55 R |
| 4,279,305 | 7/1981 | Knapp et al. | 166/307 |
| 4,436,156 | 3/1984 | Fredrickson | 166/307 |
| 4,453,596 | 6/1984 | Conway et al. | 166/307 X |
| 4,495,995 | 1/1985 | Chen et al. | 166/273 |
| 4,524,002 | 6/1985 | Hashem | 175/71 X |
| 4,554,082 | 11/1985 | Holtmyer et al. | 166/305.1 X |
| 4,737,296 | 4/1988 | Watkins | 166/307 X |
| 4,741,844 | 5/1988 | Posey, Jr. | 166/307 X |
| 4,807,703 | 2/1989 | Jennings, Jr. | 166/307 |
| 4,828,032 | 5/1989 | Teletzke et al. | 166/272 |
| 4,919,827 | 4/1990 | Harms | 166/307 X |
| 5,039,434 | 8/1991 | Watkins et al. | 252/8.553 |
| 5,203,413 | 4/1993 | Zerhboub | 166/281 |
| 5,238,067 | 8/1993 | Jennings, Jr. | 166/307 |

FOREIGN PATENT DOCUMENTS 897861 4/1972 Canada.
2072468 12/1992 Canada.

*Primary Examiner*—George A. Suchfield
*Attorney, Agent, or Firm*—Del S. Christensen

[57] ABSTRACT

The present invention is a method to improve permeability of a formation in the vicinity of a production wellbore. An acid treatment composition is placed in the formation after a foaming composition is injected and a foam created from the foaming composition, thus forcing the acid treatment composition into less permeable strata. The foaming composition contains a sulfate surfactant as a foam stabilization agent. The sulfate hydrolyzes after a time period that is long enough to permit placement of the acid treatment composition. After the sulfate hydrolyzes, it becomes ineffective as a surfactant. Fluids produced from the formation after the acid treatment according to the present invention therefore do not contain significant concentrations of active surfactants, and therefore do not create foams or emulsions in surface separation equipment.

9 Claims, 2 Drawing Sheets

ACID STIMULATION PROCESS FOR PRODUCTION FROM SUBTERRANEAN FORMATIONS

FIELD OF THE INVENTION

This invention relates to a method for acid stimulation for production from subterranean formations.

BACKGROUND OF THE INVENTION

Production of formation fluids, oil and gas in particular, from production wells tends to decrease over time in part due to gradual decreasing formation permeabilities in the vicinity of the production well. After a such a decrease in the formation permeability in the vicinity of the wellbore, a significant increase in the production rates can typically be realized by an acid treatment of the formation from the production well. U.S. Pat. Nos. 4,741,844, 4,919,827 and 5,039,434 each disclose such acid treatment processes. A typical problem with these acid treatment processes is that the injected acids tend to flow into the formations through zones that already have acceptable permeabilities, bypassing the more impaired zones.

U.S. Pat. No. 4,741,844 addresses this problem by providing an acidization composition and method that creates a foam, impairing permeability in highly permeable zones during the acid treatment and thereby forcing acidization solution into the more impaired zones. Acidization solutions taught in this patent include solutions containing a foam stabilizing formulation of salts of alkyl sulfonates and alkyl ether sulfates, along with a combination of an alcohol having one to five carbons and an alcohol having at least eight carbon atoms. Although compositions such as these can be effective to direct acid treatment solutions to less permeable strata, when production is resumed, surfactants such as the alkyl sulfonates tend to cause emulsions and/or foams in oil-water separators at the surface. These emulsions and foams create significant operational problems.

It is therefore an object of the present invention to provide a method to increase the permeability of a formation in the vicinity of a wellbore for producing formation fluids wherein the permeability is increased by an acidization treatment and wherein the more permeable zones of the formation can be temporally blocked by a foam, but wherein surfactants will not be present in the fluids produced after the acidization treatment in a concentration sufficient to cause foaming or formation of emulsions in surface separators.

SUMMARY OF THE INVENTION

This and other objects are accomplished by a method for increasing production of formation fluids from a wellbore within the formation, the method comprising the steps of:

injecting into the formation, through the wellbore, a foaming composition comprising a sulfate surfactant;

creating a foam from the foaming composition;

injecting into the formation, after the foaming composition is injected and the foam is created from the foaming composition, an acidization composition; and producing formation fluids from the formation through the wellbore wherein the produced formation fluids do not contain a significant concentration of active surfactants.

The sulfate surfactants of the present invention are effective foam stabilizers, but hydrolyze after a short period of time and will not inhibit production from the wellbore when production is resumed, and will not be the source of operational difficulties do to having active surfactants present in surface separation equipment. Ethoxysulfate surfactants are preferred.

The most preferred ethoxysulfate surfactant is a linear alcohol having from about 10 to about 20 carbon atoms, on average, and that has been ethoxylated with the addition of about 1 to about 6 ethoxy units, on the average and preferably about, on the average, 3 to 5 ethoxy units. Under typical conditions within the formation, these surfactants hydrolyze to sulfuric acid and ethoxylated alcohols. The ethoxylated alcohols can be active surfactants if they are present in sufficient concentrations, but in the concentrations of the ethoxysulfate surfactants of the present inventions, do not display surfactant activity.

DETAILED DESCRIPTION OF THE INVENTION

Figure 1:
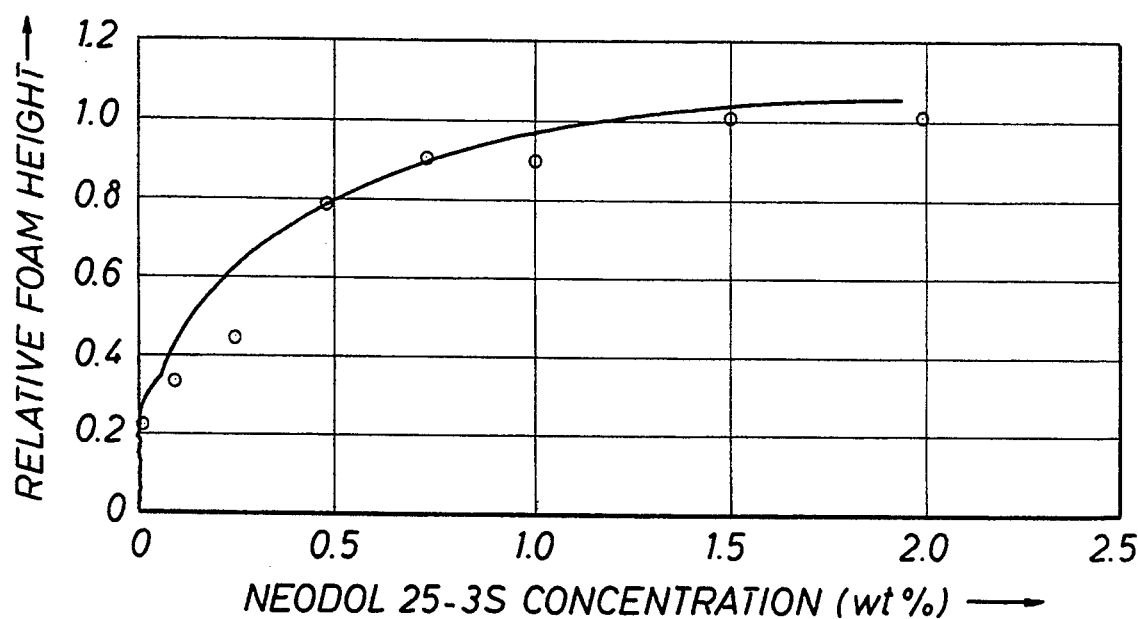
FIG. 1 is a plot of the relative foam height of solutions containing varying concentrations of a ethoxysulfate surfactant in an acidic solution.

It is known in the art that acid treatment of formations can improve near-wellbore permeability. U.S. Pat. No. 5,039,434, the disclosure of which is incorporated herein by reference, is exemplary of such art. Fluoride containing acids are typically used to treat formations that contain siliceous materials, while non-fluoride acids are more typically used to treat for treatment of formations that are predominantly non-siliceous. Calcium carbonate-containing sandstones form calcium fluoride precipitates with fluorine-containing acids. Formations that contain significant amounts of calcium carbonates are therefore typically treated with two acids in succession; first a non-fluorine containing acid to react with carbonates and remove calcium and subsequently a fluorine containing acid to react with silica and/or silicates. The present invention is applicable with any of these variations on the known acid treatment processes.

Other additives are known to be useful with the acid treatment processes. For example, corrosion inhibitors, surface active agents, viscosity modifying agents and the like can be useful in acid treatment processes. Additives such as these can also be useful in the practice of the present invention. Solutions used for the acid treatment may also contain some of the surfactant to improve compatibility between the acid treatment composition and the foaming composition.

Sulfates of the present invention can be represented by the following formula:

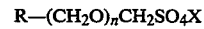

where:

R is a hydrocarbon radical;

n is an average of 0 to 6; and

X is a cation.

Preferably, n is, on the average, within the range of about 1 to about 6, and more preferably within the range of about 3 to about 5. X can be any cation, but will typically be a sodium, potassium, ammonium, or a hydrogen. These sulfate surfactants and preparation of these surfactants are well known in the art, and many such surfactants are commercially available.

These sulfate surfactants hydrolyze at low pHs to form an alcohol and a sulfate anion. This hydrolysis permits formulation of acid treatment compositions that form stable foams for limited time periods, and yet are not present in subsequently produced fluids in concentrations sufficient to create emulsion or foaming problems in surface production equipment. The low pH can be provided by including acid within the foaming composition, or could be provided by mixing the foam in-situ with acid solutions injected to accomplish the acid treatment. Including an acid within the foaming composition is preferred because of the improved control and predictability of the hydrolysis conditions. It is preferred that between about 5 and about 30 weight percent of the foaming composition be a strong acid. Acceptable strong acids include, but are not limited to, hydrochloric acid, sulfuric acid, sulfamic acid, phosphoric acid, hydrofluoric acid, fluoroboric acid, hexafluorophosphoric acid, difluorophosphoric acid, fluorosulfonic acid, and mixtures thereof.

A foam can be created from the foaming composition of the present invention at the surface and then injected into a subterranean formation, or injected into the formation in an aqueous solution and the foam created in-situ by subsequent injection of a gas. Typically, natural gas or nitrogen are injected after the foaming composition is placed in the formation to form foams in-situ.

The surfactant of the present invention can be provided in concentrations that result in stable foams, at formation temperatures, for a time period sufficiently long to permit placement of an acid treatment solution after the foaming compositions are placed within the formations. This time period may be, for example, about 1 to about 24 hours. Acceptable concentrations will typically be between about 0.1 and about 3 weight percent of the sulfate surfactant. The concentration that is required to accomplish this can be easily determined by bench-top tests. Foaming compositions containing varying concentrations of the surfactant may be agitated and the time period for which the foam remains at half or more of the initial foam height represents the time period for which the foaming composition will remain effective within the formation.

EXAMPLES

An ethoxysulfate surfactant, "NEODOL 25-3S" which is available from Shell Chemical Company was used in these examples. This ethoxysulfate is a 12 to 15 carbon linear alpha olefin that has been ethoxylated with an average of about three ethoxy units and modified with a sulfate group.

FIG. 1 is a plot of relative foam heights of varying concentrations of this surfactant in a solution of 10% by weight HCl and at 150° F. Relative foam height is defined as Foam Height divided by Initial Foam Height. From FIG. 1 it can be seen that ethoxysulfate surfactant concentrations as low as 0.3% by weight can be effective to create stable foams.

Figure 2:
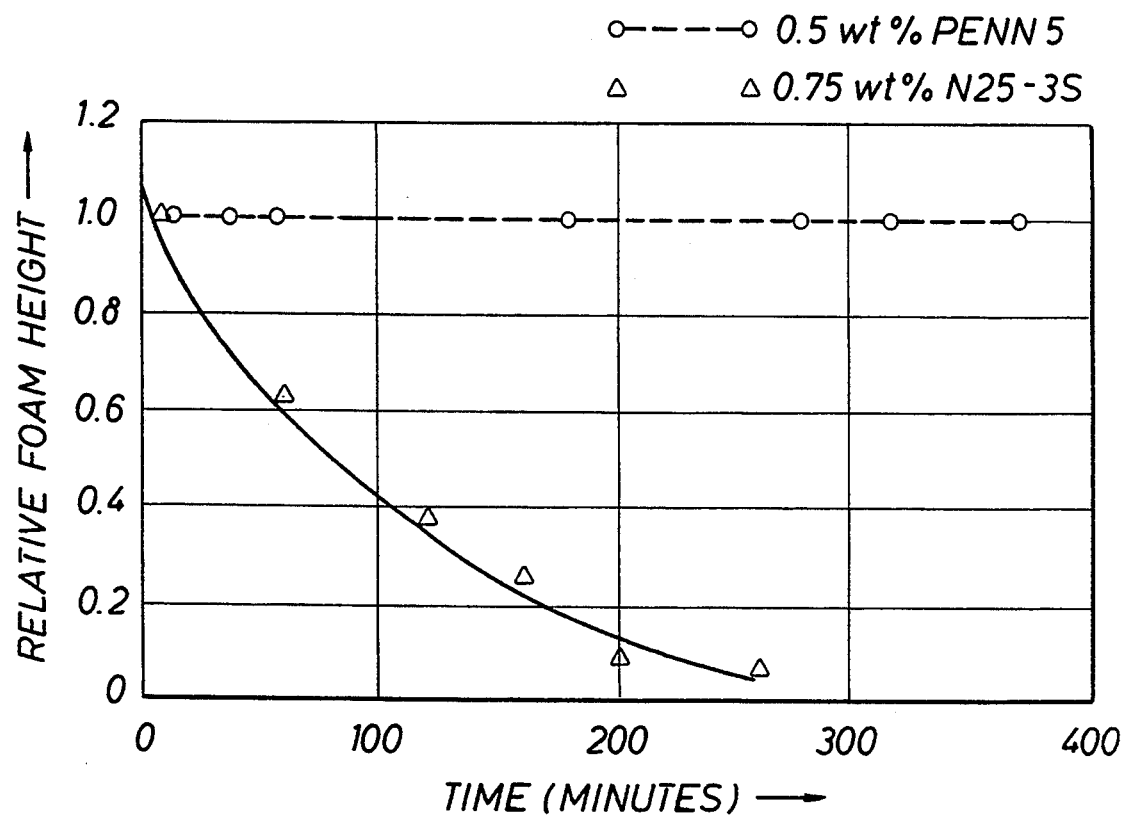
FIG. 2 is a plot of the relative foam height of a solution of 0.75% by weight of an ethoxysulfate solution as a function of time.

FIG. 2 is a plot of relative foam height of a 0.75% by weight of the surfactant in a 10% by weight solution of HCl. FIG. 2 also includes a plot of relative foam height of a common acid treatment foaming surfactant, "PENN 5", available from Halliburton Services, in a 10% by weight solution of HCl. From FIG. 2 it can be seen that the ethoxysulfate surfactant's foaming activity decreases over time while the "PENN 5" surfactant does not. If formation fluids are produced in nearly plug flow, the return solution containing "PENN 5" could create stable foams in separation facilities at the surface as effectively as the solutions created stable foams in the formation. The declining surfactant activity of the ethoxysulfate surfactant would eliminate such problems.

Figure 3:
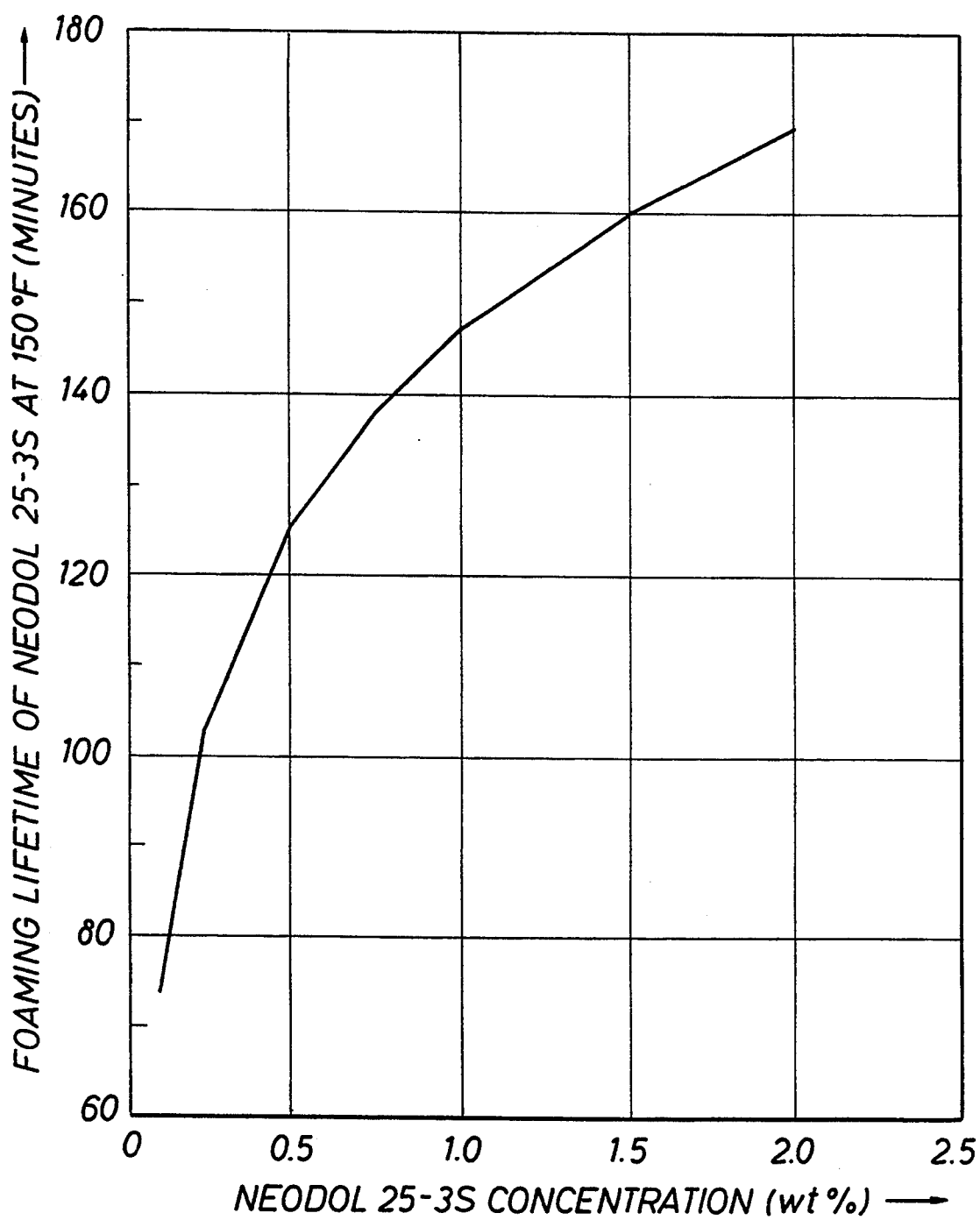
FIG. 3 is a plot of the foaming half life of ethoxysulfate solutions as a function of the concentration of the ethoxysulfate in the solution.

FIG. 3 is a plot of the half life of foam of the ethoxysulfate surfactant solutions at 150° F. in a 10% by weight solution. The half life of the foam is defined as the time required for the foam height to decrease to one half of the initial foam height. From FIG. 3 it can be seen that the effective life of the foam created by the surfactant can be controlled by adjusting the concentration of the surfactant in the initial solution.

The preceding examples and preferred embodiments are exemplary, and the following claims should be referenced to determine the scope of the present invention.

We claim:

1. A method for increasing production of formation fluids from a wellbore within the formation, the method comprising the steps of:

injecting into the formation, through the wellbore, a foaming composition comprising sulfate surfactant in an amount effective to maintain a stable foam;

creating a foam from the foaming composition;

injecting into the formation, after the foaming composition is injected and the foam is created from the foaming composition, an acidization composition;

allowing the sulfate surfactant to hydrolyze within the formation resulting in the amount of sulfate surfactant becoming ineffective to maintain a stable foam; and producing formation fluids from the formation through the wellbore wherein the produced formation fluids do not contain a significant amount of the sulfate surfactant.

2. The method of claim 1 wherein the sulfate surfactant is present in the foaming composition in an amount effective to result in a foam half-life of between about one hour and about twenty-four hours at the temperature of the formation.

3. The method of claim 1 wherein the sulfate surfactant is a sulfated ethoxylated linear alcohol having an average of between about 10 and about 20 carbon atoms in the linear alcohol and an average of between about 1 and about 6 ethoxy units.

4. The method of claim 1 wherein the foam is created in-situ.

5. The method of claim 1 wherein the foam is created at the surface and injected into the wellbore as a foam.

6. The method of claim 1 wherein the foaming composition comprises between about 0.1 and about 3 weight percent of sulfate surfactant.

7. The method of claim 1 wherein the foaming composition further comprises between about 5 and about 30 weight percent of a strong acid.

8. The method of claim 7 wherein the strong acid is selected from the group consisting of hydrochloric acid, sulfuric acid, sulfamic acid, phosphoric acid, hydrofluoric acid, fluoroboric acid, hexafluorophosphoric acid, difluorophosphoric acid, fluorosulfonic acid, and mixtures thereof.

9. The method of claim 3 wherein the linear alcohol ethoxysulfate surfactant is a sulfated ethoxylated linear alcohol having an average of between about 10 and about 20 carbon atoms in the linear alcohol and an average of between about 3 and about 5 ethoxy units.

* * * * *